July 14, 1970  E. H. WARNE  3,520,511
PULSE OPERATED VALVE
Filed Feb. 14, 1968
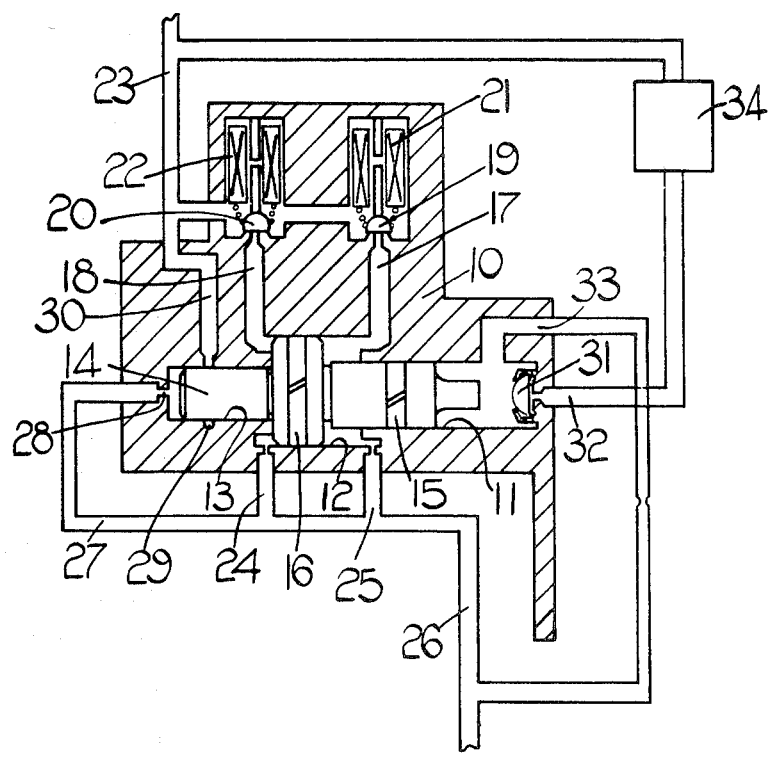
INVENTOR
E. H. Warne.
BY Beacock, Downing
          Luther
         ATTORNEYS

# United States Patent Office 3,520,511
Patented July 14, 1970

3,520,511
PULSE OPERATED VALVE
Eugene Harold Warne, Solihull, England, assignor to Joseph Lucas (Industries) Limited, Birmingham, England, a British company
Filed Feb. 14, 1968, Ser. No. 705,444
Int. Cl. F16k *31/06*
U.S. Cl. 251—30                                        4 Claims

ABSTRACT OF THE DISCLOSURE

A valve comprising a body, a member within the body, the position of the member determining direction or ability for flow to take place through a passage, the position of member being maintained by fluid pressure on the ends of the member respectively, and two valves controlling entry of fluid to the body at alternative sides of the member in response to reception of respective signal pulses, and initiating movement of the member from one of its positions to the other.

---

This invention relates to valves of the kind intended to control fluid flow and the object of the invention is to provide such a valve in a convenient form.

In accordance with the present invention a valve comprises a body, a member disposed within the body and capable of occupying either of two positions, the position of the member determining the direction of flow of fluid through passage means in the body or the ability for flow to take place therethrough, the member having a mid-region movable in a cylinder, to opposite ends of which fluid can flow and from opposite ends of which fluid can escape through respective restricted entry and escape passages, the entry passages to opposite ends of said chamber being in use, subjected to fluid under pressure and having respective valve closure members which are operable in response to reception of signal pulses to open them, the member also having end portions disposed in respective further cylinders in the body, entry passages in the body communicating with said further cylinders respectively, said entry passages being subjected, in use, to fluid under pressure, and restricted escape passage communicating with said further cylinders respectively, entry of fluid to one of said further cylinders only at any one time being controlled by the position of the member.

The invention will now be described by way of example with reference to the accompanying drawing which illustrates one form of valve constructed in accordance with the invention.

The valve comprises a body 10 having three co-axial interior cylinders 11, 12, 13 the central cylinder 12 being larger in diameter than the remaining two cylinders 11 and 13. Disposed within the cylinders 11, 12, 13 is a member 14 having an enlarged mid-region engageable in the cylinder 12 and having respective end portions engageable in the cylinders 11 and 13 respectively. The end portion which is engaged in the cylinder 11 is reduced at its free extremity, and there are sealing rings 15, 16 on the portions engaged in the cylinders 11, 12 respectively.

Communicating with opposite sides of the enlarged portion of the member 14 are entry passages 17, 18 respectively, these passages being provided with valve closure members 19, 20 springloaded towards their closed positions and movable towards their open positions under the influence of electrical solenoids 21, 22 respectively. Opening of the valve closure members 19, 20 affords communication between the passages 17, 18 with a passage 23 which communicates with a source of fluid under pressure, when the valve is in use.

Also communicating with the ends of the cylinder 12 on opposite sides of the enlarged portion of the member 14 respectively are restricted escape passages 24, 25 which are connected together and are in turn connected to a further passage 26 which communicates with a relatively low pressure region of an associated system, such as a reservoir.

Communicating with the outer end of the cylinder 13 is a passage 27 which also communicates with the passage 26. The passage 27 incorporates a restrictor 28.

In the cylinder 13, spaced from its outer end is an annular gallery 29 which communicates, through a passage 30, with the passage 23 from the high pressure source.

At the outer end of the cylinder 11 is a caged valve closure member 31 which controls flow of fluid from an external source through a passage 32 into the cylinder 11, there being a restricted escape passage 33 leading from this cylinder. The passage 32 contains a device indicated at 34 which performs a function when fluid is flowing through it.

In system with which the valve is intended to be associated the passages 23, 32 are in communication with one another so that both are subjected to high pressure. In the position of the member 14 illustrated, the valve closure member 31 can move away from the end to the passages 32, thus permitting fluid to flow into the cylinder 11 and out through the passage 33. This passage 33 communicates with the passage 26.

If it is desired to close communication between the passages 32 and 33, the member 14 is moved to the right by opening the valve closure member 20. This is achieved by energisation of the electrical solenoid 22, whereupon high pressure is applied through the passage 18 to the side of the enlarged portion of the member 14 to move it to the right until its end engages the valve closure member 31, thus closing communication between the passages 32 and 33. When the member 14 has reached this position high pressure fluid can enter the cylinder 13 through the gallery 29 and the passage 30, and escapes through the restricted passage 28. This holds the member in its selected position, and travel of the member 14 is permitted by means of the escape passage 25. De-energisation of the electrical solenoid 22 results in the member 14 remaining in this selected position until the solenoid 21 is energised. This permits entry of fluid to the passage 17 to return the member 14 to the position illustrated.

The valve may be modified to control direction of flow of fluid and to this end the valve closure member 31 and associated passage 32 are omitted and the portion of the member 14 engaging in the cylinder 11 is provided with grooves so that it acts as a spool valve in conjunction with axially spaced passages entering the cylinder 11. However, in one of the positions of the member 14 fluid pressure acts upon the end of the member 14 in the cylinder 11 to hold this member in such position.

Having thus described my invention what I claim as new and desire to secure by Letters Patent is:

1. A valve comprising a body, passage means in the body, a member disposed within the body and capable of occupying either of two positions, the position of the member controlling flow of fluid through the passage means in the body, the body defining a cylinder in which a mid-region of the member is movable, entry and escape passages in the body through which fluid can enter and escape from opposite ends of the cylinder, the entry passages to opposite ends of said cylinder being, in use, subjected to fluid under pressure, respectively valve closure members in said entry passages respectively, said members being operable in response to reception of signal pulses to open them, the member also having end portions disposed in respective further cylinders in the body entry passages in the body communicating with said further cylinders respectively, said entry passages being subjected, in use, to fluid under pressure, and a restricted escape passage communicating with said further cylinders respectively, entry of fluid to one of said further cylinders only at any one time being controlled by the position of the member.

2. A valve as claimed in claim 1 in which the entry passages to ends of the cylinder have respective valve closure members operable by respective electrical solenoids.

3. A valve as claimed in claim 1 in which the member has three coaxial portions disposed in the cylinder and said further cylinders in the body respectively.

4. A valve as claimed in claim 1 in which the member is arranged to act upon a valve closure member at the end of one of the further cylinders in one position holding it closed and in the other position permitting flow of fluid through said further cylinder to hold the member in said other position, such flow taking place through said passage means in the body.

References Cited

UNITED STATES PATENTS

| | | | |
|---|---|---|---|
| 2,900,960 | 8/1959 | Gratzmuller | 91—426 |
| 3,350,054 | 10/1967 | Wray et al. | 251—29 |
| 3,386,466 | 6/1968 | Brunsing | 251—24 X |

ARNOLD ROSENTHAL, Primary Examiner

U.S. Cl. X.R.

251—31; 91—426